Oct. 4, 1966  R. B. POPPE ETAL  3,276,397
PROCESS AND APPARATUS FOR MAKING PASTRY PRODUCTS
Filed Nov. 7, 1963  2 Sheets-Sheet 1
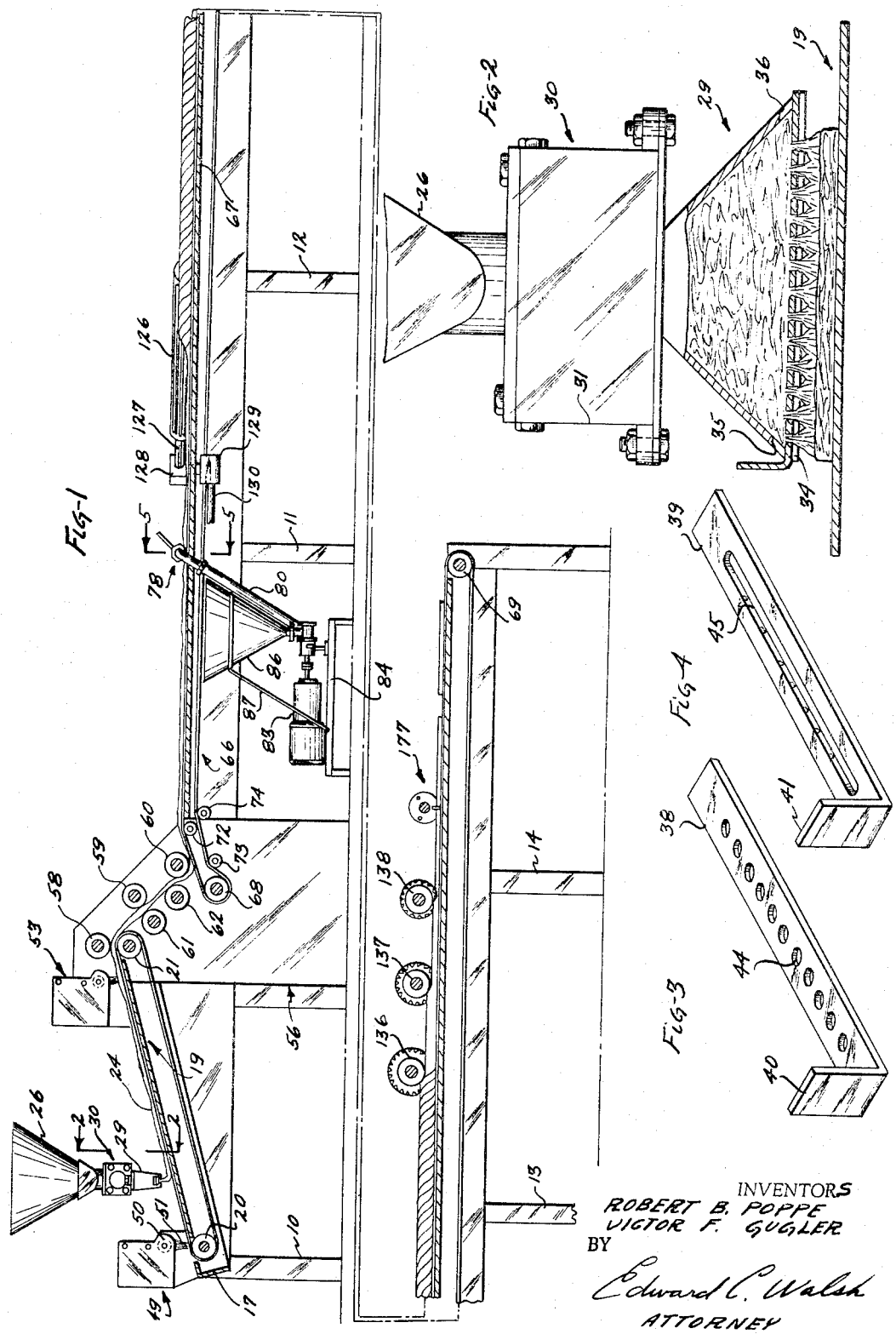
INVENTORS
ROBERT B. POPPE
VICTOR F. GUGLER
BY
Edward C. Walsh
ATTORNEY

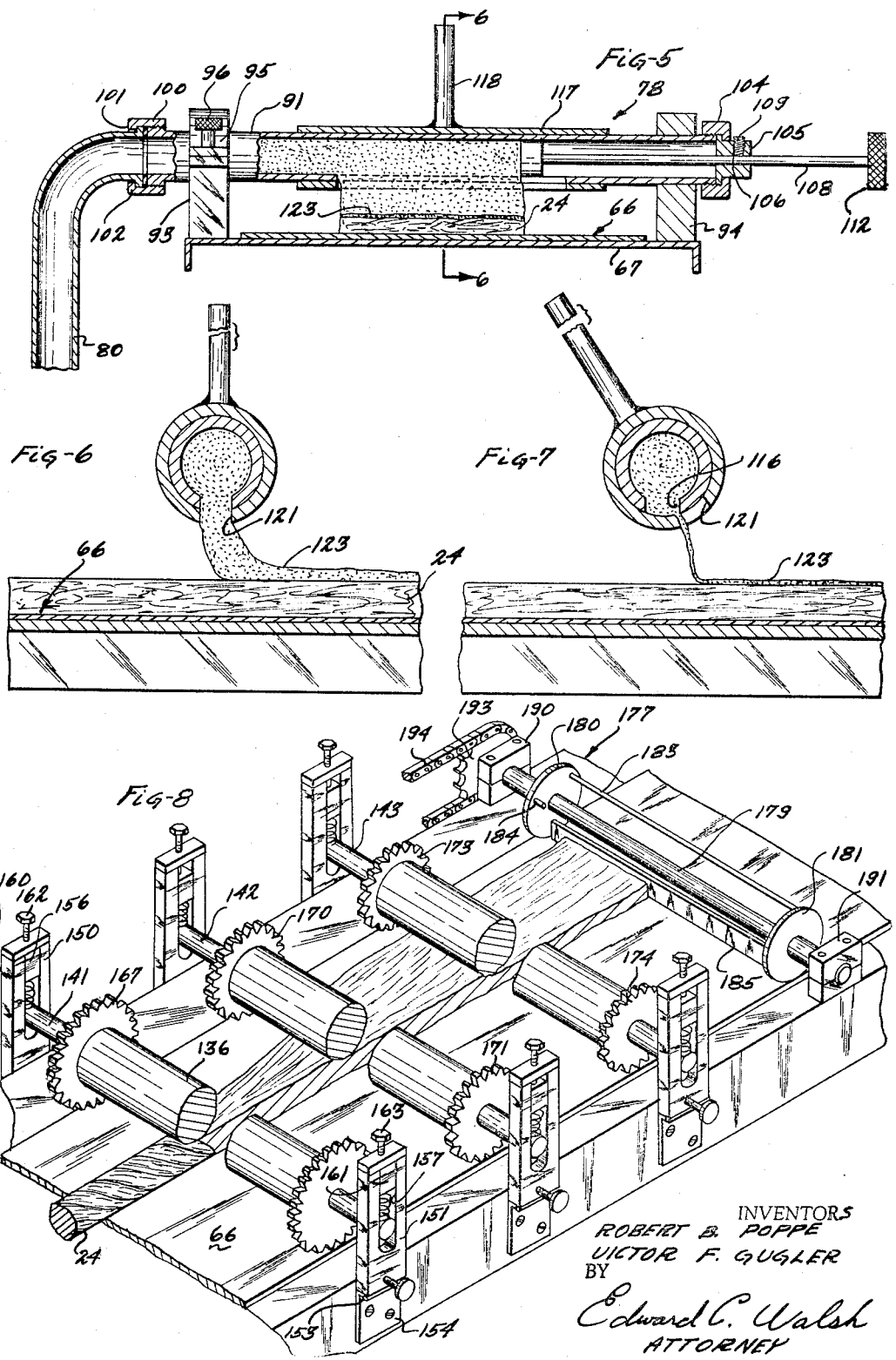

United States Patent Office 3,276,397
Patented Oct. 4, 1966

3,276,397
PROCESS AND APPARATUS FOR MAKING PASTRY PRODUCTS
Robert B. Poppe, 14875 Gale Ave., Hacienda Heights, Calif., and Victor F. Gugler, 8920 Helen St., Sun Valley, Calif.
Filed Nov. 7, 1963, Ser. No. 322,147
12 Claims. (Cl. 107—4)

This invention relates to an improved process and apparatus for making pastry products, particularly roll-in type pastries, i.e., pastries having layers of fat or the like between layers of dough.

Examples of products of this type are puff paste, butter gems, tarts, turn-overs and Danish pastry, as well as certain other sweet goods items other than the roll-in type.

The primary object of the invention is to make it possible to make or produce these products by machine or mechanical process other than by hand.

Another object is to make it possible to provide better products of this type having an improved quality.

Another object is to make it possible to provide products of this type which are uniform in thickness, length and width.

Another object is to make possible the more uniform and complete distribution of fat in the products.

Another object is to make it possible to realize laminations of fat and dough which are even and unbroken.

In order to understand the invention, a general understanding should be had of the conventional practices in the baking industry with respect to pastries of the type referred to. There are several varieties of baked products that depend on multi-layers of fat and dough to result in the desired physical properties after baking. These physical properties include that the products have desirable flaky and edible qualities. The characteristics of the product are controlled by certain variables. First among these is the formation of the dough portion, which may be composed of only flour and water and a small amount of shortening, as in puff pastry; or flour and water and high quantities of sugar, eggs and shortening, as in Danish pastry; or flour and water with no eggs but rich in sugar and shortening, as in the flaky dough from which butter gems are made.

Another variable involves the quantity and type of fat that is layered between the dough layers. This fat may be shortening that varies in stiffness (viscosity) by the amount of high temperature melt point fats it is compounded from, or the degree of hydrogenization. (In the manufacture of shortening, fats are exposed to hydrogen gas to control their hardness.) It may be butter or margarine. The word "fat" as used herein has reference to any of these fats referred to above.

A further variable resides in the rolling of the dough and fat into layers, including the number of rollings and the time between rollings.

The foregoing three variables depend upon corresponding processing steps, and after these steps the rolled dough is ready to be processed into the dough shape required for the resultant finished product.

Briefly, the methods conventionally in use in the baking industry are as follows, Danish pastry being referred to as an example. The dough portion is first mixed and then scaled into predetermined dough pieces either by hand or through a dough-scaling machine. The fat is also pre-weighed, being scooped from a drum or barrel or corrugated board box. After weighing, the fat is formed into balls. These are then placed on pans on storage racks pending usage. Their weight varies according to the size of the dough each ball will be rolled into and the ratio of fat to dough, which varies as much as one fat to 10 dough, to one fat and 1½ dough. The average for most Danish is one fat to 4–8 dough. Individual baker's preference and economy result in these variables. The higher the ratio of fat to dough, the more costly the rolled-in Danish becomes because of the relatively higher cost of fat. Then follows the rolling-in process.

The pre-scaled dough piece is hand or machine rolled into a rectangular shape and the pre-scaled fat ball is broken into small pieces by hand, and "spotted" over two-thirds of the area of dough. Some bakers prefer to smear this fat by hand to form a layer over two-thirds of the surface. The one-third portion of dough is hand-folded over one-half of the fat surface. The dough with the fat surface exposed is then folded over it. This is known as the "spotting in" fold and produces two layers of fat and three layers of dough. This dough and fat piece will then weigh 10 to 15 pounds. Subsequent processing is to give this piece two or three folds, or two or three four-folds, or one three-fold and one four-fold, based on the baker's preference.

A three-fold is made by rolling or sheeting the dough into a large sheet using a hand-powered rolling pin or mechanical sheeting roller. One-third of this sheet is folded over the middle third and the other one-third is folded over it.

A four-fold is formed by sheeting the dough into a long, rectangular shape by hand, using a rolling pin with mechanical sheeters, then by folding both ends toward the middle and folding the resultant dough in the middle again.

At any stage of processing this Danish pastry, the baker may prefer to retard it, which means he will place it in a cool 40°–48° F. cabinet or room for any length of time he deems necessary. This time may be minutes or over night. Because each piece is handled separately and must be transferred on and off storage racks, it is usually placed on a standard 18" x 26" baking pan, which baking pan has flour on it to keep the dough from sticking.

The herein invention provides a process and apparatus for preparing pastries of the type referred to which overcomes all of the disadvantages and drawbacks and lack of economy of the conventional way of preparing these pastries, and accomplishes all of the objects and advantages referred to above.

Further objects and advantages will become apparent from the following detailed description and annexed drawings illustrating a preferred embodiment of the process and apparatus of the invention.

FIG. 1 is a diagrammatic view in elevation of a preferred form of machine for performing the process;

FIG. 2 is a sectional view taken on the line 2—2 of FIG. 1;

FIGS. 3 and 4 are detailed views of control members used in the dough extruder;

FIG. 5 is a sectional view taken on line 5—5 of FIG. 1;

FIG. 6 is a sectional view taken on line 6—6 of FIG. 5;

FIG. 7 is a view similar to FIG. 6 showing the control device of FIG. 6 in a different position; and FIG. 8 is a perspective view of the sheeting rollers of FIG. 1.

The following is a description of a preferred apparatus for performing the process of the invention, after which the manner in which the process itself is performed will be described.

With respect to the process generally, it may be said at the outset that the machine or apparatus makes pastry in two stages. First the dough is rolled out and a low melting point margarine is spread on, and then the dough is given a three-fold and a four-fold. Next the dough is retarded for an hour or 1½ hours at about 45° F. after which it is brought and given a final four-fold.

FIG. 1 is an elevational partly schematic view showing a preferred type of apparatus for performing the process. The machine comprises a frame structure having uprights 10, 11, 12, 13 and 14. These uprights support an inclined platform 17 and a first endless conveyor belt 19 which passes over roller members 20 and 21 on shafts journaled in the platform structure supported by the uprights. The dough is fed, that is extruded from a head onto the conveyor belt 19 in the form of a sheet as designated at 24. Dough troughs may be lifted hydraulically to the dough hopper 26 which feeds through the extruder to the conveyor. The dough is forced to the extruder head 29 by means of a pump 30. The dough extrusion nozzle is of a special type as will be described. FIG. 2 shows the pump 30 and extruder head 29 in greater detail. The motor 30 is in a housing 31 and is of an appropriate type to drive the dough through the extruder. The extruder head flares downwardly as shown, and has an elongated slot or opening in the bottom as designated at 34. The head has side openings 35 and 36 into which can be slid a control member or slide which may be of the type as designated at 38 in FIG. 3, or 39 in FIG. 4. These slides have upturned ends as shown at 40 and 41 for inserting and removing them. The slide 38 has spaced openings 44 and the slide 39 has elongated slots 45 in it. These openings determine the shape and rate of the extrusion of the dough and control the width and thickness of the dough strip that is extruded onto the conveyor belt.

In FIG. 1, ahead of the extruder is a flour hopper 49 which may be of a conventional type for feeding or dusting flour onto the conveyor belt ahead of the dough strip. It has a roller 50 in it and a discharge opening for feeding or dusting the flour 51 onto the conveyor belt.

A second flour feeder or duster is designated at 53 in a position to dust flour onto the dough strip 24 as it is being conveyed on the belt 19.

The machine has an intermediate frame structure 56 in which are journaled a plurality of shafts for dough rollers 58, 59, 60, 61 and 62 between which the strip of dough passes on its way to a further elongated endless conveyor belt 66. The dough has a viscosity such that it appropriately passes between these rollers as shown and onto the table conveyor belt 66.

The conveyor belt 66 passes over rollers 68 and 69 on shafts journaled in the frame structure supported by the various uprights. Both of the conveyor belts are driven by motors at suitable adjustable speeds. The conveyor belt 66 also is positioned by idler rollers 72, 73 and 74 on shafts journaled in the frame structure.

The platform 67 and the upper reach of the conveyor belt are horizontal. After the dough passes onto the conveyor belt 66, a layer of fat is extruded onto it. The fat is distributed onto the dough in a layer by an adjustable extruder head as designated at 78 and as shown in more detail in FIGS. 5, 6 and 7. The fat is delivered to the extruder head 78 through a tube 80 from a sanitary pump of known type of construction as designated at 81. This may be, by way of example, a Jabsco self-priming "Pureflo" sanitary pump manufactured by Jabsco Pump Company. The pump is driven at a suitable controlled speed by a motor 83, the motor and pump being on a platform 84. The fat is fed to the inlet of the pump from a hopper 86 held in position by brace members as designated at 87.

The extruder head 78 is specially constructed to make it possible to readily adjust the position of the film or strip of fat that is extruded, as well as the width and thickness of it. Referring to FIGS. 5, 6 and 7, the extruder head comprises a tubular member 91 mounted in a position over the platform 67 and conveyor belt 66. It is supported by pedestals or brackets as designated at 93 and 94 which include removable upper holding clamps as designated at 95 attached by screws as shown at 96. The left end of the tube 91 is threaded as shown and fits into a threaded collar 100 having a flange 101 which engages a flange 102 on the end of the feed pipe for the fat 80 so that the fat is fed into the end of the tube 91.

The other end of the tube 91 is threaded as shown and fitting on it is a collar 104 having an extending part 105 with a bore 106 through which extends a shaft 108 which may be set in position by a set screw 109. The shaft 108 extends into the tube 91 and has a piston 111 on the end of it. The shaft 108 is axially adjustable by an operating knob 112.

The tube 91 has an elongated slot in it as designated at 116 in FIG. 7. Surrounding the tube 91 is an angularly adjustable sleeve 117 adjustable by a handle 118. The sleeve 117 has an elongated slot 121 in it as may be seen in FIGS. 6 and 7. The strip of fat that is extruded from the head 78 is designated at 123 in the figures. As may be seen, the head provides adjustments for adjusting the position at which the fat is extruded, as well as the thickness of the film of fat that is extruded and the width of the strip. The piston 111 may be manually adjusted in the bore of the tube 91 as described to thus limit the extent to which fat is forced into the tube 91 and accordingly the width of the strip that is extruded through the slots 116 and 121. By angularly adjusting the position of sleeve 117, the amount of overlapping of the elongated slots 116 and 121 is adjusted and thereby the thickness of the extruded film is adjusted as indicated in the figures. The position of the film can be adjusted by moving sleeve 117 axially.

By feeding a continuous strip of fat, a high quality of the finished product is realized. The strip of fat is premeasured, closely controlled and is of full width, resulting in the most uniform possible distribution of fat on the dough. The strip of fat covers the dough out to the edge and covers it evenly, leaving no blank spaces and permitting no variation in the thickness of the laminations of fat.

In FIG. 1, after the dough passes the extruding head 78, the single layer of dough and single layer of fat continue until the leading edge impinges on a curling roller as designated at 126. This is a conventional component in the form of a ribbed roller on a shaft 127 in a diagonal position over the platform 67 and upper reach of the conveyor belt 66. The ends of the shaft 127 are suitably journaled in bearings supported by the platform 67. A gear drive is provided for the shaft 127 in housings 128 and 129 providing for drive through a shaft 130. The curl given the dough is the exact equivalent of a conventional three-fold and takes the place of the conventional spotting-in fold. The speed at which the curling attachment revolves is synchronized with the rate of travel of the conveyor through the drive shaft, both of these devices getting their power from the same motor, not shown. The fat depositor and the dough depositor are each separately powered, however.

After passing the curling attachment, the dough passes to a set of sheeters installed over the platform 67. The sheeters flatten the dough strip which is then cut into 22-inch lengths, for example, by a rotary cutter. Preferably, three sheeters are provided as shown in FIG. 8, although there may be other numbers. The sheeters are in the form of rollers 136, 137 and 138 mounted on shafts 141, 142 and 143 at different heights above the platform 67 and conveyor belt 66 so as to progressively flatten the cured or rolled dough and fat as designated at 24. The shaft 141 is journaled in hinged brackets 158 and 151 which are hinged as shown, the hinge for the bracket 151 being designated at 155 including a hinge part 154 attached to the side parts of the platform 67. The brackets 150 and 151 have slots in them as shown at 156 and 157 which receive the ends of the shaft 141 and spring adjustments for the position of the shaft are provided by way of the sliding blocks 160 and 161 and adjusting screws 162 and 163. The shafts 142 and 143 are adjustably mounted by similar means which will not be described in detail since they are the same as the mountings for the shaft 141. At the ends of the roller 136 are toothed discs 167 and 168 which engage with the conveyor belt so as to be driven thereby to rotate the roller 136. The roller 137 has similar discs 170 and 171 and roller 138 has similar discs 173 and 174.

The rotary cutter comprises a rotor designated generally at 177 in FIG. 8. This rotor comprises a shaft 179 and end discs 180 and 181. The shaft 179 is journaled in pedestal bearings 190 and 191 at its ends and at the end of the shaft is a sprocket wheel 193 driven by link chain 194 from a suitable drive motor and at an appropriate adjustable cutting speed. Between the end discs are spacer rods 183 and 184 and a single knife or cutter bar 185 which upon each revolution of the rotor, cuts off a section of the flattened pastry as described above. By way of example, the 22-inch lengths of pastry are cut to fit a 24-inch bun pan and may weigh about 3 pounds 12 ounces each. Preferably the cut pieces are removed manually from the conveyor and stacked four high on the bun pans. This gives the dough the equivalent of a conventional four-fold and the dough is ready to be retarded.

From the foregoing those skilled in the art will understand the apparatus of the invention and its operation. With respect to the process, preferably the process is performed essentially by the machine as a continuous process. The continuous process is preferred. In the continuous process, the dough is fed onto the first conveyor through the extruder as described in the foregoing and as shown in detail in FIG. 2. The dough is pumped through the extruder outlet by the pump as described. Flour is sifted onto the conveyor belt before the dough is extruded thereonto and also afterward. The dough strip passes under the fat depositor which pumps a continuous ribbon of fat on it through the extruder nozzle as described in connection with FIGS. 5, 6 and 7. The thickness and width of the fat are controlled by spot adjustments on the machine as described. The continuous strip depositing of fat step contributes to the high quality of the finished product. The strip of margarine is pre-measured and it is a closely controlled full width strip that results in the most uniform possible distribution of fat on the dough. The strip covers the dough out to the edge and covers it evenly, leaving no blank spaces and permitting no variation in thickness of the laminations of fat.

The dough strip with its coating of fat next passes to the curling component. The curl given the dough is the exact equivalent of a conventional three-fold and takes the place of a spotting-in fold. The speed at which the curling component revolves as described above is synchronized with the rate of travel of the conveyor through a drive shaft.

Next the dough strip is conveyed through the sheeters which flatten the dough strip as described, which is then cut into 22-inch lengths, for example, by the rotary cutter. The cut pieces are removed manually from the conveyor and stacked as described in the foregoing.

In addition to the improvements in uniformity and quality of product resulting from the process as described, there are other gains in sanitation and efficiency. Preferably all parts of the machine that come in contact with ingredients of the finished product are made of stainless steel. The fat or margarine may be placed in the hopper directly from the sealed cartons in which it is shipped, eliminating any exposure to impurities. If necessary, the fat may be brought to the right level of plasticity for handling through the extruder by tempering it in a dry-proof box overnight so that at the time of use it is at a temperature of 76° F., for example. The method of the invention has also eliminated many scaling variables in handling margarine, losses resulting from spillage, sticking to storage containers, etc. Also significant savings are realized in the use of dusting flour, while at the same time improving quality.

The machine and process can also be utilized in the depositing of filling for apple turn-overs, in which case the machine drops an exact pre-measured amount of apple filling on the proper spot on the dough strip to be folded into three-cornered turn-overs. The extruder may also be used to add fillings to coffee cake dough, handling fruit bits, as well as more free-flowing fillings.

From the foregoing, those skilled in the art will observe that the invention as described herein achieves and realizes all of the objects and advantages of the process and apparatus as described in the foregoing, as well as having many additional advantages which are apparent from the detailed description.

The foregoing disclosure is representative of preferred forms of the invention and is to be interpreted in an illustrative rather than a limiting sense, the invention to be accorded the full scope of the claims appended hereto.

We claim:

1. A method of preparing pastry products of the roll-in type comprising feeding dough onto a conveyor to form a layer of predetermined thickness, passing the layer of dough onto a table conveyor, extruding filler such as fat or the like onto the layer of dough in a layer of controlled width and thickness, curling the layer of dough and filler into a roll, passing the roll under sheeting roller means for flattening the roll into a sheet and cutting the said sheet into lengths, retarding the material for a period of time in the range of 1 to 1½ hours at a substantially predetermined temperature after stacking the several lengths to provide the equivalent of a final four-fold.

2. A method of preparing pastry products of the roll-in type comprising pumping dough from a hopper and through an extruding head onto a conveyor belt in a layer of controlled width and thickness, mechanically dusting flour onto the conveyor belt ahead of the layer of dough, dusting flour onto the layer of dough beyond the extruder head, passing the dough through a set of rollers onto a table conveyor, extruding a layer of fat in a plastic state through an extruder head onto the layer of dough in a strip of controlled width, position and thickness, pumping fat from a hopper to the extruder head, passing the layer of dough and fat to a curling roller to curl the layers into a roll, passing the rolled material through a plurality of sheeters to reduce the material to a relatively flat sheet, cutting the sheet into pieces of predetermined length, removing the pieces from the conveyor, stacking them on pans and retarding the material for a period in the range of 1 to 1½ hours at a predetermined temperature.

3. A machine for making pastry products of the roll-in type comprising in combination a dough feeding and extruding device, the said extruding device having means for controlling the width and thickness of the layer of dough extruded, a first conveyor positioned to have the dough extruded thereon, a table conveyor and roller means for transporting the layer of dough from the first conveyor to the table conveyor, a hopper for fat, a fat extruder positioned over the table conveyor, power-driven pump means for pumping fat from the hopper to the fat extruder, the said fat extruder having means for controlling the position, width and thickness of fat extruded therefrom onto the layer of dough, a curling roller mounted over the table conveyor in a position to curl the layers of dough and fat into a roll, a sheeter means mounted over the table conveyor for flattening the roll of material into a sheet of predetermined thickness, and rotary cutter means mounted over the table conveyor for cutting the sheet of laminated dough and fat material into pieces of predetermined length.

4. A machine for making pastry products of the roll-in type comprising in combination a dough feeding and extruding device, the said extruding device having means for controlling the width and thickness of the layer of dough extruded, a first conveyor positioned to have the dough extruded thereon, a second table conveyor and roller means for transporting the layer of dough from the first conveyor to the table conveyor, a hopper for fat, a fat extruder positioned over the table conveyor, power-driven pump means for pumping fat from the hopper to the fat extruder, the said fat extruder having means for controlling the position, width and thickness of fat extruded therefrom onto the layer of dough, a curling roller mounted over the table conveyor in a position to curl the layers of dough and fat into a roll, sheeter means mounted over the table conveyor for flattening the roll of material into a sheet of predetermined thickness, and rotary cutter means mounted over the table conveyor for cutting the sheet of laminated dough and fat material into pieces of predetermined length, the said fat extruder comprising a tubular member positioned over the table conveyor and having an elongated slot in it, adjustable stop means within the tubular member to determine the extent to which the tubular member may be filled with fat, an angularly movable sleeve around said tubular member and having an elongated slot in it whereby the sleeve member may be angularly adjusted to adjust the amount of overlapping of the elongated slots in the tubular member and in the sleeve whereby to control the thickness of the layer of fat extruded from the extruder head.

5. A machine for making pastry products of the roll-in type comprising in combination, a dough-feeding and extruding device for extruding dough in a continuous strip, the said extruding device having means for controlling the width and thickness of the layer of dough extruded, a first conveyor positioned to have the dough extruded thereon, a horizontal table conveyor and roller means for transporting the layer of dough from the first conveyor to the table conveyor, a hopper for fat, a fat extruder positioned over the table conveyor, power-driven pump means for pumping fat in a plastic state from the hopper to the fat extruder, the said fat extruder having means for controlling the position, width and thickness of the fat extruded therefrom onto the layer of dough, and means operating on and permitting the composite materials comprising layers of dough and fat to form the equivalent of a final four-fold.

6. A method of preparing pastry products of the roll-in type comprising pumping dough from a hopper and through an extruder head and thereby forming a layer of dough on a conveyor belt of regulated width and thickness, conveying the layer of dough to a table conveyor, extruding a layer of fat in a plastic state through an extruder head onto the layer of dough and regulating the thickness, position and width of the layer of fat relative to the layer of dough, pumping the fat in a plastic state from the hopper to the extruder head, passing the layer of dough and fat to a curling roller to curl the layers into a roll, driving the curling roller at a speed synchronized with that of the speed of movement of the table conveyor, passing the rolled material through a plurality of sheeters to reduce the material to a relatively flat sheet, cutting the sheet into pieces of predetermined length, removing the pieces from the conveyor and stacking them in a manner to provide a finished product having a desired number of alternate layers of dough and fat.

7. A method of preparing pastry products of the roll-in type comprising feeding dough onto a conveyor to form a layer of controlled width and thickness, extruding filler such as fat or the like onto the layer of dough in a layer of controlled width and thickness, curling the layer of dough and filler into a roll, passing the roll under sheeting roller means for flattening the roll into a sheet and cutting the said sheet into lengths, stacking the cut material to provide the equivalent of a four fold, and retarding the material for a period of time in the range of 1 to 1½ hours at a substantially predetermined temperature.

8. A machine for making pastry products of the roll-in type comprising in combination, a dough feeding and extruding device, the said extruding device being arranged for controlling the width and thickness of the layer of dough extruded, conveyor means for transporting the layer of dough, a hopper for fat, a fat extruder positioned over the conveyor, power driven pump means for pumping fat from the hopper to the fat extruder, the said fat extruder having means for controlling the position, width, and thickness of fat extruded therefrom onto the layer of dough, a curling roller mounted over the conveyor in a position to curl the layers of dough and fat into a roll, and sheeter means mounted over the conveyor means for flattening the roll of material into a sheet of predetermined thickness.

9. A machine as in claim 8 including rotary cutter means mounted over the conveyor means for cutting the sheet of laminated dough and fat material into pieces of predetermined length.

10. A machine for making pastry products of the roll-in type comprising in combination, a dough feeding and extruding device, the said extruding device being arranged for controlling the width and thickness of the layer of dough extruded, a conveyor positioned to transport extruded dough thereon, a hopper for fat, a fat extruder positioned over the conveyor, power driven pump means for pumping fat from the hopper to the fat extruder, the said fat extruder having means for controlling the position, width, and thickness of fat extruded therefrom onto the layer of dough, a curling roller mounted over the conveyor in a position to curl the layers of dough and fat into a roll, sheeter means mounted over the conveyor for flattening the roll of material into a sheet of predetermined thickness, rotary cutter means mounted over the conveyor for cutting the sheet of laminated dough and fat material into pieces of predetermined length, the said fat extruder comprising a tubular member positioned over the conveyor and having an elongated slot in it, adjustable stop means within the tubular member to determine the extent to which the tubular member may be filled with fat, an angularly movable sleeve around said tubular member and having an elongated slot in it whereby the sleeve member may be angularly adjusted to adjust the amount of overlapping of the elongated slots in the tubular member and in the sleeve whereby to control the thickness of the layer of fat extruded from the extruder head.

11. A method of preparing pastry products of the roll-in type comprising pumping dough from a hopper and through an extruder head and forming a layer of dough on a conveyor belt of regulated width, and thickness, extruding a layer of fat in a plastic state through an extruder head onto the layer of dough and regulating the thickness, position, and width of the layer of fat relative to the layer of dough, pumping the fat in a plastic state from a hopper to the extruder head, passing the layer of dough and fat to a curling roller to curl the layer into a roll, driving the curling roller at a speed synchronized with that of the speed of movement of the conveyor, passing the rolled material through sheeter means to reduce the material to a relatively flat sheet, cutting the sheet into pieces, removing the pieces from the conveyor and stacking them in a manner to provide a finished product having a desired number of alternate layers of dough and fat.

12. A method as in claim 11 including retarding the material for a predetermined period of time at a substantially predetermined temperature.

References Cited by the Examiner
UNITED STATES PATENTS

| | | | |
|---|---|---|---|
| 2,337,539 | 12/1943 | Buechek | 107—9 |
| 2,450,033 | 9/1948 | Cohen | 107—4.3 |
| 2,531,093 | 11/1950 | Walker | 118—24 |
| 2,576,670 | 11/1951 | Cohen | 107—9 X |
| 2,627,825 | 2/1953 | Stiles | 107—9 X |
| 2,888,888 | 6/1959 | Jorgenson et al. | 107—54 |
| 2,981,211 | 4/1961 | Emerzian | 107—14 |

WALTER A. SCHEEL, *Primary Examiner.*

J. SHEA, *Assistant Examiner.*